(12) United States Patent
Nakajima et al.

(10) Patent No.: US 9,519,087 B2
(45) Date of Patent: Dec. 13, 2016

(54) PRISMATIC RETROREFLECTIVE SHEETING WITH REDUCED RETROREFLECTIVITY OF INFRA-RED LIGHT

(75) Inventors: Toshitaka Nakajima, Yamagata-Pref (JP); Masami Yokoyama, Yamagata-Pref. (JP); Akira Muramoto, Kanagawa (JP)

(73) Assignee: 3M Innovative Properties Company, St. Paul, MN (US)

( * ) Notice: Subject to any disclaimer, the term of this patent is extended or adjusted under 35 U.S.C. 154(b) by 597 days.

(21) Appl. No.: 13/502,251

(22) PCT Filed: Oct. 12, 2010

(86) PCT No.: PCT/US2010/052363
§ 371 (c)(1),
(2), (4) Date: Apr. 16, 2012

(87) PCT Pub. No.: WO2011/046957
PCT Pub. Date: Apr. 21, 2011

(65) Prior Publication Data
US 2012/0200710 A1    Aug. 9, 2012

Related U.S. Application Data

(60) Provisional application No. 61/252,244, filed on Oct. 16, 2009.

(51) Int. Cl.
*H04N 7/18* (2006.01)
*G02B 5/124* (2006.01)
(Continued)

(52) U.S. Cl.
CPC ............... *G02B 5/124* (2013.01); *B60R 13/10* (2013.01); *G02B 5/208* (2013.01)

(58) Field of Classification Search
CPC .......... H04N 7/18; H04N 7/181; G02B 5/124; G02B 5/22; G02B 5/122; G02B 5/04; G02B 5/02; G02B 5/208; B60R 1/00; B60R 2300/105; B60R 11/04; B60R 2300/802; G01J 3/00; C08K 5/3437; C08K 5/23; C08K 5/08; C08K 5/357; C08K 5/1545; C08K 5/54; C08L 33/06; F16F 15/00; G01N 21/55; G09F 13/16; G09F 13/20; B60R 13/10; G08K 5/54
(Continued)

(56) References Cited

U.S. PATENT DOCUMENTS

| 4,025,159 A | 5/1977 | McGrath |
| 4,082,426 A | 4/1978 | Brown |

(Continued)

FOREIGN PATENT DOCUMENTS

| EP | 0 416 742 | 3/1991 | |
| EP | 0416742 A2 * | 3/1991 | ............... G06K 9/00 |

(Continued)

OTHER PUBLICATIONS

International Search Report for PCT International Application No. PCT/US2010/052363, Mailed Jun. 30, 2011, 3 pages.

*Primary Examiner* — Chikaodili E Anyikire
*Assistant Examiner* — Dramos I Kalapodas

(57) ABSTRACT

The present application relates to retroreflective sheeting that is capable of use in a license plate and that can be accurately read and/or detected by an ALPR system. The retroreflective sheeting is a prismatic retroreflective sheeting that provides reduced retroreflectivity of infra-red light. The retroreflective sheeting can also be a prismatic retroreflective sheeting that exhibits reduced retroreflectivity of inci- (Continued)

dent infra-red light and substantially unaffected retroreflectivity of incident visible light.

38 Claims, 2 Drawing Sheets

(51) Int. Cl.
    *G01J 3/00*         (2006.01)
    *C08K 5/3437*     (2006.01)
    *B60R 13/10*      (2006.01)
    *G06K 19/06*     (2006.01)
    *G02B 5/20*       (2006.01)

(58) Field of Classification Search
    USPC .............. 348/148, 359; 359/530, 350, 533
    See application file for complete search history.

(56) References Cited

U.S. PATENT DOCUMENTS

| | | | |
|---|---|---|---|
| 4,368,979 A * | 1/1983 | Ruell | B60R 13/10 250/271 |
| 5,138,488 A | 8/1992 | Szczech | |
| 5,200,851 A * | 4/1993 | Coderre et al. | 359/351 |
| 5,387,458 A | 2/1995 | Pavelka | |
| 5,450,235 A | 9/1995 | Smith | |
| 5,605,761 A | 2/1997 | Burns | |
| 5,614,286 A | 3/1997 | Bacon | |
| 5,691,846 A | 11/1997 | Benson, Jr. | |
| 5,763,049 A * | 6/1998 | Frey | G02B 5/124 156/196 |
| 6,091,469 A | 7/2000 | Naito | |
| 6,157,486 A | 12/2000 | Benson, Jr. | |
| 6,224,792 B1 | 5/2001 | Janovec | |
| 6,243,201 B1 | 6/2001 | Fleming | |
| 7,329,447 B2 | 2/2008 | Chirhart | |
| 7,387,393 B2 | 6/2008 | Reich | |
| 2002/0030112 A1* | 3/2002 | Schreiber | G06K 7/12 235/494 |
| 2002/0195490 A1* | 12/2002 | Gehlot | B60R 13/10 235/384 |
| 2003/0016368 A1* | 1/2003 | Aman et al. | 356/615 |
| 2004/0089727 A1* | 5/2004 | Baharav | G06K 1/121 235/494 |
| 2004/0211837 A1* | 10/2004 | Eisenberg | G02B 5/124 235/462.41 |
| 2007/0082963 A1* | 4/2007 | Bhatt | B41M 3/14 522/6 |
| 2008/0192233 A1* | 8/2008 | Rosania | G02B 5/208 356/51 |
| 2008/0285804 A1* | 11/2008 | Sefton | G06K 9/00771 382/105 |
| 2009/0202105 A1* | 8/2009 | Castro Abrantes et al. | 382/100 |
| 2009/0237791 A1* | 9/2009 | Nilsen | G02B 5/124 359/530 |
| 2010/0053754 A1* | 3/2010 | Chapman et al. | 359/530 |
| 2010/0202143 A1* | 8/2010 | Ruehlemann | G09F 13/22 362/249.01 |
| 2011/0084126 A1* | 4/2011 | Fleming et al. | 235/375 |
| 2011/0134623 A1* | 6/2011 | Sherman et al. | 362/19 |
| 2014/0285889 A1* | 9/2014 | Smithson | B60R 13/10 359/530 |

FOREIGN PATENT DOCUMENTS

| | | |
|---|---|---|
| JP | H07-092301 | 4/1995 |
| JP | 2000-112411 | 4/2000 |
| KR | 10-2006-0648448 | 11/2006 |
| WO | WO 2006/132502 | 12/2006 |
| WO | WO 2007/005357 | 1/2007 |

* cited by examiner

PRISMATIC RETROREFLECTIVE SHEETING WITH REDUCED RETROREFLECTIVITY OF INFRA-RED LIGHT

CROSS REFERENCE TO RELATED APPLICATIONS

This application is a national stage filing under 35 U.S.C. 371 of PCT/US2010/052363, filed Oct. 12, 2010, which claims priority to Provisional Application 61/252,244, filed Oct. 16, 2009, the disclosure of which is incorporated by reference in its/their entirety herein.

The present disclosure generally relates to prismatic retroreflective sheeting having reduced retroreflectivity of infra-red light, to a license plate including such retroreflective sheeting, and to an automated license plate reader system capable of reading such a license plate.

BACKGROUND

Retroreflective materials are characterized by the ability to redirect light incident on the material back toward the originating light source. This property has led to the widespread use of retroreflective sheeting for a variety of traffic and personal safety uses. Retroreflective sheeting is commonly employed in a variety of articles, for example, road signs, barricades, license plates, pavement markers and marking tape, as well as retroreflective tapes for vehicles and clothing.

Two known types of retroreflective sheeting are cube corner sheeting and microsphere-based sheeting. Microsphere-based sheeting, sometimes referred to as "beaded" sheeting, employs a multitude of microspheres typically at least partially embedded in a binder layer and having associated specular or diffuse reflecting materials (e.g., pigment particles, metal flakes or vapor coats, etc.) to retroreflect incident light. Cube corner retroreflective sheeting, sometimes referred to as "prismatic" sheeting, typically comprises a thin transparent layer having a substantially planar first surface and a second structured surface comprising a plurality of geometric structures, some or all of which include three reflective faces configured as a cube corner element.

Due to the symmetrical geometry of beaded retroreflectors, microsphere based sheeting exhibits the same total light return regardless of orientation, i.e., when rotated about an axis normal to the surface of the sheeting. Thus, such microsphere-based sheeting has a relatively low sensitivity to the orientation at which the sheeting is placed on a surface. In general, however, such sheeting has a lower retroreflective efficiency than cube corner sheeting.

Various types of prismatic retroreflective sheeting are known. For example, U.S. Pat. No. 5,200,851 to Coderre et al. describe prismatic retroreflective sheeting that retroreflects infra-red light but does not substantially retroreflect visible light. The cube-corner elements in the retroreflective sheeting include a polymeric matrix selected to be highly transmissive to infra-red light but substantially opaque to visible light.

U.S. Pat. No. 6,157,486 to Benson et al. describes a reflective film including alternating layers of at least a first and second polymer. The alternating polymeric layers are configured to exhibit a high reflectance for light within a first spectral range and a low reflectance for light within a second spectral range. One exemplary spectral range can be infra-red light and the other exemplary spectral range can be visible light.

U.S. Pat. No. 7,329,447 to Chirhart et al. describes a retroreflective layer having a first cap-Y value and a plurality of discrete pigmented indicia disposed thereon. The pigmented indicia define a second cap-Y value of the viewing surface of the sheeting, the second cap-Y value being less than the first cap-Y value.

PCT Publication No. WO 2007-005357 to Nakajima describes a transparent, wavelength-selective retroreflector that retroreflects light within a specific wavelength range and is transparent to visible light.

In recent years, the use of prismatic retroreflective sheeting has been investigated for a use in license plates. However, in at least some instances, use of prismatic retroreflective sheeting results in poor visibility and an inability to read the characters on the license plate due to halation (the spreading of light beyond its desired boundaries in a developed photographic image) when the retroreflective license plate is imaged in an automated license plate reader ("ALPR") system.

ALPR systems detect and recognize a vehicle using an electronic system. Exemplary uses for ALPR include, for example, automatic tolling, traffic law enforcement, searching for vehicles associated with crimes, and facility access control. One advantage of ALPR systems is that they are can be used almost universally, since almost all areas of the world require that vehicles have license plates with visually identifiable information thereon. However, the task of recognizing visual tags can be complicated. For example, the read accuracy from an ALPR system is largely dependent on the quality of the captured image as assessed by the reader. Existing systems have difficulty distinguishing tags from complex backgrounds and handling variable lighting. One exemplary ALPR system is described in U.S. Pat. No. 7,387,393 to Reich et al. (counterpart to Japanese Patent Application Publication No. 2007-171956). ALPR systems typically use an infra-red camera and an infra-red light source that emits light rays that are incident upon the license plate. The infra-red camera and/or infra-red light source in many ALPR systems is located above or in the vicinity of the road. Consequently, the infra-red light emitted by the camera and/or light source is incident on the license plate at high entrance angles.

SUMMARY

The present inventors recognized a need for prismatic retroreflective sheeting that is capable of use in a license plate and that can be accurately read and/or detected by an ALPR system. The present inventors also recognized that there is currently no known prismatic retroreflective sheeting that provides the reduced infra-red retroreflectivity desirable for use in a license plate that could be read by an ALPR system. The present inventors also recognized that there is currently no known prismatic retroreflective sheeting exhibiting reduced retroreflectivity of incident infra-red light and substantially unaffected retroreflectivity of incident visible light while maintaining the desired whiteness (also referred to as CAP-Y). These qualities are desirable for a retroreflective sheeting suitable for use in a license plate that could be read by an ALPR system. The present inventors also recognized that inclusion of infra-red absorbing or scattering materials in prismatic retroreflective sheeting could create the types of retroreflective sheeting described above. Because inclusion of infra-red absorbing or scattering materials in sheeting could, in some exemplary implementations, result in a decrease in whiteness, the inventors of the present application also recognized that a whiteness-enhancing material could also be included in some exemplary implementations of the retroreflective sheeting.

One object of the present application is to provide prismatic retroreflective sheeting that is capable of use in a license plate and that can be accurately read and/or detected by an ALPR system. Another object of the present application is to create a prismatic retroreflective sheeting that exhibits reduced retroreflectivity of incident infra-red light and substantially unaffected retroreflectivity of incident visible light while maintaining a desired whiteness (or CAP-Y).

One exemplary embodiment of the present application is a retroreflective sheet including cube corner elements; a reflector layer adjacent to the cube corner elements; and an infra-red non-transmissive material. The cube corner elements can be, for example, full cubes, truncated cubes, cube corner type trigonal pyramids, cube corner type cavities, and the like. In some embodiments, the infra-red non-transmissive material forms a separate layer. In other embodiments, the infra-red non-transmissive material is in the cube corner elements. Some embodiments may also optionally include a whiteness-enhancing material. In some embodiments that include the optional whiteness enhancing material, the whiteness enhancing material is in the cube corner elements. In other embodiments that include the optional whiteness enhancing material, the whiteness enhancing material and the infra-red non-transmissive material form a separate layer.

Another exemplary embodiment of the present application is a retroreflective sheet including cube corner elements; a reflector layer adjacent to a backside of the cube corner elements; and an infra-red non-transmissive layer adjacent to a front side of the cube corner elements. Some embodiments may also include a whiteness-enhancing material deposited on the infra-red non-transmissive layer.

Another exemplary embodiment of the present application is a retroreflective sheet including cube corner elements including an infra-red non-transmissive material; and a reflector layer adjacent to a backside of the cube corner elements. Some embodiments may optionally include a whiteness-enhancing material. In at least some of those embodiments, the whiteness-enhancing material is deposited into a front side of the cube corner elements. In some other embodiments, the cube corner elements include the whiteness-enhancing material.

Another exemplary embodiment of the present application is a license plate utilizing at least one of the retroreflective sheets described above.

Another exemplary embodiment of the present application is an ALPR system, including a license plate utilizing at least one of the retroreflective sheets described above; a light source that directs light at the license plate; and a machine capable of imaging a license plate.

DETAILED DESCRIPTION

The present application describes prismatic retroreflective sheeting that provides reduced retroreflectivity of incident infra-red light. The present application also describes prismatic retroreflective sheeting that exhibits reduced retroreflectivity of incident infra-red light and substantially unaffected retroreflectivity of incident visible light while maintaining a desired whiteness or CAP-Y. Such retroreflective sheeting is capable of use in a license plate and can be accurately read and/or detected by an ALPR system. The prismatic retroreflective sheeting of the present application includes infra-red absorbing or scattering materials that cause the retroreflective sheeting to (1) appear bright when illuminated by visible light and (2) appear darker when illuminated by infra-red light. By appearing darker when illuminated by infra-red light, the incidence of halation is minimized when the retroreflective sheeting is photographed by an infra-red camera. Inclusion of some types of infra-red absorbing or scattering materials in prismatic retroreflective sheeting can sometimes result in a decrease in whiteness. Consequently, the inventors of the present application also recognized that a whiteness-enhancing material could also be included in the retroreflective sheeting to maintain a desired whiteness (or CAP-Y).

As used herein, the term "transparent" indicates transmittance for desired wavelength that is greater than or equal to 30%, preferably greater than or equal to 50%, and more preferably greater than or equal to 70% at 50 µm thickness. Visible light transmittance can be measured using a spectrophotometer.

Figure 1:
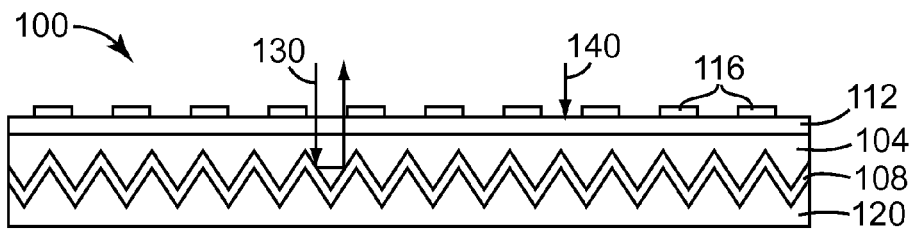
FIG. 1 shows a cross section of one embodiment of a retroreflective sheeting in accordance with the present disclosure.

One exemplary embodiment of the present application is shown in FIG. 1. Retroreflective sheet 100 includes cube corner elements 104 whose backside is coated with a reflector layer 108 (here shown as metallization with aluminum) and whose frontside is coated with an infra-red non-transmissive layer 112 (e.g., an infra-red absorbing or scattering layer). A whiteness-enhancing material 116 (here shown as dots of white ink) is applied to at least portions of infra-red non-transmissive layer 112. The entire cube corner sheeting optionally includes an adhesive layer 120 adjacent to reflector layer 108 to permit adhesion of retroreflective sheeting 100 to a substrate.

When visible light 130 is incident on retroreflective sheet 100 from the normal direction, visible light 130 passes through the infra-red absorbing layer 112, is reflected by cube corner elements 104, and is redirected toward the originating light source. In contrast, when infra-red light 140 is incident on retroreflective sheet 100 from any entrance angle, infra-red light 140 is absorbed and/or scattered by the infra-red non-transmissive layer 112. In this way, retroreflection of the infra-red light is suppressed. Those of skill in the art will appreciate that many changes may be made to the exemplary implementation described above without departing from the scope of the present disclosure.

Cube corner elements 104 can be any suitable cube layer adapted to reflect light back toward its source. In an exemplary embodiment, cube corner elements 104 are formed from a polycarbonate. In another embodiment, cube corner elements 104 are cast from an epoxy acrylate radiation curable resin. In one example, cube corner elements 104 include a substantially planar viewing surface and structured surface, although other viewing surfaces are contemplated. In some exemplary embodiments, cube corner elements 104 are canted with respect to each other such that retroreflectivity is improved over a wider range of incident light angles.

Cube corner elements 104 can, for example, include generally trihedral structures that have three approximately mutually perpendicular lateral faces meeting in a single corner: a cube corner. In use, retroreflective sheeting 100 is arranged with its viewing surface disposed generally toward the anticipated location of intended observers and the light source. Light incident on the viewing surface enters retroreflective sheeting 100 and passes through the body of the sheeting to be reflected by each of the three faces of cube corner elements 104, so as to exit the viewing surface in a direction substantially toward the light source. Illustrative examples of cube corner-based retroreflective sheetings are disclosed in U.S. Pat. No. 5,138,488 to Szczech; U.S. Pat. No. 5,387,458 to Pavelka; U.S. Pat. No. 5,450,235 to Smith; U.S. Pat. No. 5,605,761 to Burns; U.S. Pat. No. 5,614,286 to Bacon; and U.S. Pat. No. 5,691,846 to Benson, Jr.

Preferred polymers for cube corner elements 104 include poly(carbonate), poly(methylmethacrylate), poly(ethylene-terephthalate), aliphatic polyurethanes, as well as ethylene copolymers and ionomers thereof. Cube corner elements 104 for use in retroreflective sheeting 100 may be prepared by casting directly onto a film, such as described, for example, in U.S. Pat. No. 5,691,846 to Benson, Jr. Preferred polymers for radiation-cured cube corner sheetings include, for example, cross linked acrylates, such as multifunctional acrylates or epoxies and acrylated urethanes blended with mono- and multifunctional monomers. Further, cube corner sheetings may be cast onto plasticized polyvinyl chloride film for more flexible cast cube corner sheeting. These polymers are preferred for one or more reasons including, for example, thermal stability, environmental stability, clarity, excellent release from the tooling or mold, and capability of receiving a reflective coating.

The coefficient of retroreflection for cube corner sheeting is usually at least about 200 candelas per lux for fluorescent orange and at least about 550 candelas per lux for a white sheeting.

Retroreflective sheeting 100 relies on the principle of total internal reflection; therefore, the air interfaces in the cube corner cavities preferably remain free of dirt, water and adhesive. Accordingly, cube corner elements 104 may be enclosed by a seal film. A seal film may be applied to cube corner elements 104 through the application of heat and pressure or other techniques, as taught in, for example, U.S. Pat. No. 6,224,792 to Janovec. Preferred seal films preferably include a durable polymeric material. Some illustrative examples include thermoplastic, heat-activated, ultraviolet cured, and electron beam cured polymer systems. Preferred seal film materials soften sufficiently to flow under pressure at between about 75° C. to about 95° C., but remain substantially firm at temperatures below about 65° C. Exemplary seal films may be subsequently cured or crosslinked, as taught in, for example, U.S. Pat. No. 4,025,159 to McGrath. Exemplary seal film materials include, for example, acrylic-based monomers, such as polyethylene glycol diacrylates and hydroxymethyl diactone acrylamide and acrylic-based polymeric materials, such as acrylate or methylacrylate polymers or copolymers. An especially suitable material is co-polyethylene terephthalate ("COPET"). Exemplary seal films may include adjuvents, for example, a whitening pigment, such as titanium dioxide, or other suitable colorants. Exemplary seal films are preferably sufficiently thick to effectively seal cube corner elements 104 and yet not so thick that material is wasted or retroreflective sheeting 100 becomes so thick that edge sealing becomes more difficult. In an exemplary embodiment, the thickness of a seal film is at least about 0.03 mm (1.18 mils), more preferably at least about 0.06 mm (2.36 mils), but generally the thickness does not exceed about 0.3 mm (11.81 mils).

In instances where cube corner sheeting is employed as retroreflective sheeting 100, a backing layer may be present for the purpose of opacifying the laminate or article, improving the scratch and gouge resistance thereof, and/or eliminating the blocking tendencies of a seal film.

Reflector layer 108 preferably has good adhesion to the cube corner elements 104. Reflector layer 108 can be formed, for example, using metal vapor deposition. Aluminum, silver, or the like may be used as the metal. Use of a suitable primer material such as a titanium metal sputter coated on cube corner elements 104 has been found to enhance the adhesion of the vapor deposition. As is known, use of a metallic layer, such increases the entrance angularity of cube corner elements 104. Alternatively, reflector layer 108 can include a multilayer reflective coating disposed on the cube corner elements, such as is described, for example, in U.S. Pat. No. 6,243,201 to Fleming. The thickness of reflector layer 108 is preferable between about 300 to about 800 Angstroms.

Infra-red non-transmissive layer 112 includes an infra-red non-transmissive material. The term "infra-red non-transmissive material" in the present application refers to a material that absorbs or scatters infra-red radiation and that does not substantially allow transmission of infra-red radiation. Exemplary infra-red non-transmissive materials include near infra-red radiation absorption agents that absorb or scatter near infra-red radiation (e.g., wavelengths of between about 760 nm and about 1500 nm). Transmittance of infra-red radiation can be measured using a spectrophotometer. Exemplary organic infra-red non-transmissive materials include, for example, carbon black, polymethine type compounds, pyrylium type compounds, thiopyrylium type compounds, squalium type compounds, croconium type compounds, azulenium type compounds, phthalocyanine type compounds, tetrahydrocholine type compounds, dithiol metal complex salt type compounds, naphthoquinone type compounds, antimonate type compounds, anthraquinone type compounds, triphenylmethane type compounds, aminium type compounds, dimonium type compounds, and the like. Exemplary inorganic infra-red non-transmissive materials include, for example, compounds such as antimony tin oxide (ATO), indium tin oxide (ITO), $LaB_6$, tin oxide, tin-antimony oxide, titanium dioxide, iron oxide, aluminum, tin-lead alloy, gold, silver, and the like. In some exemplary embodiments, the powder of the infra-red reflection agent is dispersed in a resin. One infra-red non-transmissive material that is commercially available and that does not absorb much visible light is Epolight 5588 Near Infrared Dye sold by Epolin, Inc.

For at least some preferred embodiments of the present application, the infra-red non-transmissive layer 112 completely coats or covers the entire surface of the retroreflective sheeting. In some other preferred embodiments, the infra-red non-transmissive layer 112 only partially covers the retroreflective sheeting. In such embodiments, the infra-red non-transmissive layer 112 could be selectively coated onto the retroreflective sheeting or onto the cube corner elements, so that it would reduce infra-red retroreflectivity at certain angles.

The infra-red transmittance proportion of the infra-red non-transmissive material is largely dependent on the concentration and dispersal of the infra-red non-transmissive material through the thickness of the layer in which the infra-red non-transmissive material is located. For example, in the embodiment shown in FIG. 1, the infra-red transmittance proportion of infra-red non-transmissive layer 112 will largely depend on the concentration and dispersal of the infra-red non-transmissive material through the thickness of infra-red non-transmissive layer 112. The infra-red transmittance for infra-red radiation may be less than or equal to 50%, and is preferably less than or equal to 10%.

Inclusion of some exemplary types of infra-red absorbing or scattering materials in sheeting can result in a decrease in whiteness of the retroreflective sheeting because many commonly used infra-red absorbing and/or scattering dyes show some amount of absorption in the visible spectrum. Consequently, the inventors of the present application also recognized that a whiteness-enhancing material could optionally be included in or coated onto the retroreflective sheeting. This coating ensures that the retroreflective sheeting appears white in daylight. "Whiteness" is measured by a "cap-Y" scale. Whiteness-enhancing material 116 can be disposed on retroreflective sheeting 100 in numerous variations of orientations, indicia sizing, indicia density, indicia placement, and indicia pigmenting to achieve a desired brightness and whiteness of the viewing surface side of sheeting 100. In many preferred embodiments, whiteness-enhancing material 116 coats at least a portion of the retroreflective sheeting. Whiteness-enhancing material 116 effectively increases the whiteness of retroreflective sheeting 100.

At least some whiteness-enhancing materials may decrease the retroreflecticity of the retroreflective sheeting 100. Thus, if less brightness is desired in sheeting 100, whiteness-enhancing material 116 can be configured to cover a smaller area of the viewing surface side of sheeting 100. This can be accomplished, for example, by decreasing the size of each discrete pigmented element or by increasing the density of elements, or a combination of both. If increased whiteness is desired, whiteness-enhancing material 116 can be configured to cover a larger area of the viewing surface side of sheeting 100. This can be accomplished, for example, by increasing the size of each discrete pigmented element or by increasing the density of elements, or a combination of both. By adding whiteness-enhancing material 116 to sheeting 100, a coefficient of retroreflection and/or a whiteness level of a retroreflective sheeting 100 can be increased in a controlled manner to a desired level.

The backside of reflector layer 108 may be coated with adhesive layer 120. One exemplary type of adhesive layer 120 includes a pressure-sensitive adhesive coated on a silicon-coated paper liner that is capable of lamination to the backside of reflector layer 108. The thickness of the adhesive layer 120 may be any desired thickness. Preferred adhesive layer thicknesses are between about 0.050 mm and about 0.200 mm.

Figure 2:
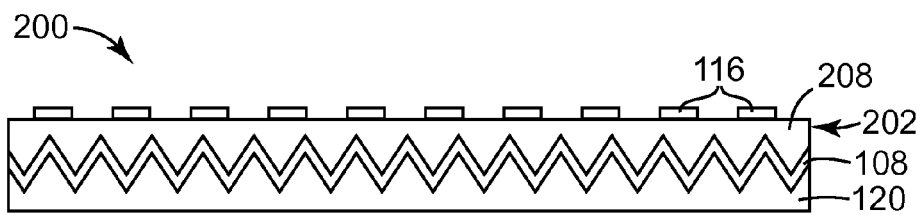
FIG. 2 shows a cross section of another embodiment of a retroreflective sheeting in accordance with the present disclosure.

An alternative embodiment is shown in FIG. 2. Retroreflective sheeting 200 of FIG. 2 is substantially the same as retroreflective sheeting 100, except that infra-red non-transmissive material 202 is directly adjacent to cube corner elements 208. In this specific embodiment, the backside of cube corner elements 208 is not coated with a reflector layer.

Figure 3:
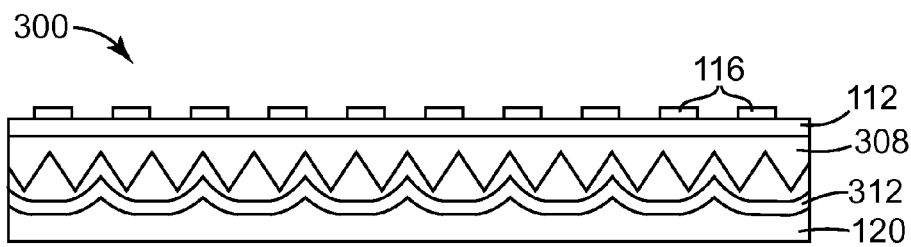
FIG. 3 shows a cross section of another embodiment of a retroreflective sheeting in accordance with the present disclosure.

Another alternative embodiment is shown in FIG. 3. Retroreflective sheeting 300 of FIG. 3 is substantially the same as retroreflective sheeting 100, except that retroreflective sheeting 300 includes a sealing film 312. In this specific embodiment, the backside of cube corner elements 308 is not coated with a reflector layer.

Figure 4:
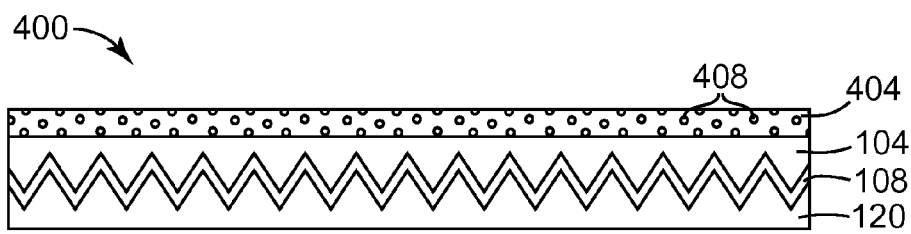
FIG. 4 shows a cross section of another embodiment of a retroreflective sheeting in accordance with the present disclosure.

Another alternative embodiment is shown in FIG. 4. Retroreflective sheeting 400 of FIG. 4 is substantially the same as retroreflective sheeting 100, except that the layer including infra-red non-transmissive material 404 also includes a whiteness enhancing material 408.

Figure 5:
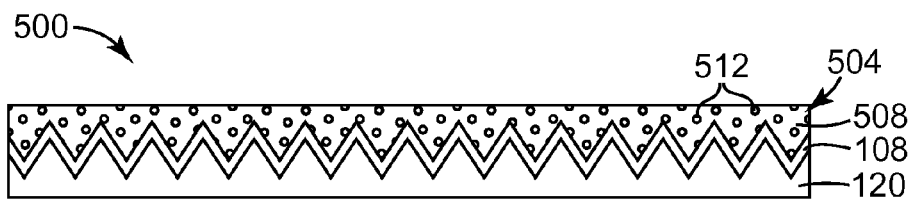
FIG. 5 shows a cross section of another embodiment of a retroreflective sheeting in accordance with the present disclosure.

Another alternative embodiment is shown in FIG. 5. Retroreflective sheeting 500 of FIG. 5 is substantially the same as retroreflective sheeting 100, except that the infra-red non-transmissive material 504 is directly adjacent to cube corner elements 508 and the layer including infra-red non-transmissive material 504 also includes a whiteness enhancing material 512.

Figure 6:
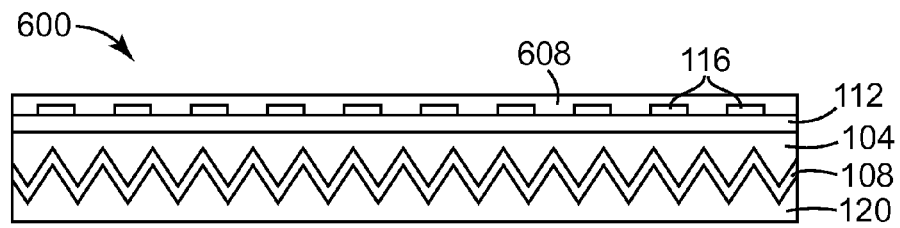
FIG. 6 shows a cross section of another embodiment of a retroreflective sheeting in accordance with the present disclosure.

Another alternative embodiment is shown in FIG. 6. Retroreflective sheeting 600 of FIG. 6 is substantially the same as retroreflective sheeting 100, except that sheeting 600 includes a clear coat 608, preferably of the type described above as a protective layer. Clear coat 608 can also be referred to as, for example, a protective layer, an overlay layer, a seal film, a cover film, a top film, or a top coat. Exemplary protective layers include transparent materials of sufficient weathering resistance and moldability. In an exemplary embodiment, a protective layer includes a substantially transparent cover film, a pigmented or unpigmented layer, and pigmented indicia. Exemplary protective layers are preferably tear-resistant. The retroreflective sheeting may be bonded directly to the protective layer or indirectly, by means of one or more intermediate layers such as tie layers, sealing layers, prime layers, etc.

Figure 7:
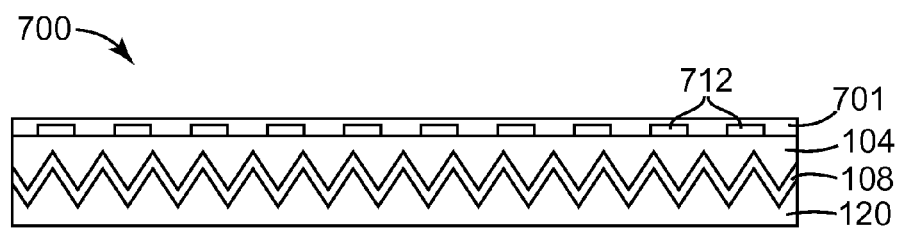
FIG. 7 shows a cross section of another embodiment of a retroreflective sheeting in accordance with the present disclosure.

Another alternative embodiment is shown in FIG. 7. Retroreflective sheeting 700 of FIG. 7 is substantially the same as retroreflective sheeting 100, except that infra-red non-transmissive material 701 is coated over the whiteness enhancing material 712.

Another alternative embodiment (not shown) involves coating the infra-red non-transmissive material onto the cube-corner elements. This could also be done with the whiteness-enhancing material, if one is present.

The retroreflective sheetings described above can be produced by any known methods. One exemplary method involves preparing a polycarbonate cube layer using standard thermal processing methods. A PMMA overlay film including indicia using a vinyl-based ink having a titanium dioxide pigment was then adhered thereto. An overlay layer was then laminated to the cube layer using standard heat lamination techniques, while ensuring that the printed side of the overlay layer faced the cube layer, thus burying the printed indicia under the overlay. The structured surface of the cube layer was sealed with seal film by application of heat and pressure. The seal film was coated on an opposite side with pressure sensitive adhesive layer. A release liner was added to complete the retroreflective sheeting. Next, a resin including an infra-red non-transmissive layer was applied cube corner elements. The infra-red non-transmissive layer was then cured, and a metal is vacuum vapor deposited onto the infra-red non-transmissive layer to form the reflector layer. Lastly, the whiteness enhancing material was applied to the sheeting.

The various embodiments of retroreflective sheeting described above can be used, for example, to make a license plate. In such implementations, the retroreflective sheeting can be embossed or debossed with standard embossing equipment to form the license plate number. Alternatively, or in addition to embossing, the license plate number can be applied to the retroreflective sheeting using an ink, toner, or dye. Resulting license plates can, for example, be used in ALPR systems. Because license plates using these types of retroreflective sheeting do not retroreflect infra-red light, the incidence of halation is reduced and the license plates are better able to be read by ALPR systems.

Those of skill in the art will appreciate that the present application covers the use of all types of prismatic sheeting including, for example, full cubes, truncated cubes, cube corner type trigonal pyramids, cube corner type cavities, and the like.

EXAMPLES

Although examples and comparative examples are described below to explain the present disclosure in further detail, the present disclosure is not limited by these examples.

Example 1

Urethane acrylate resin (GA-3 sold by Sumitomo 3M Ltd.) including 1% by weight of an infra-red absorbing material (EX Color IR-10A sold by Nippon Shokubai Co. Ltd.) having a thickness of approximately 20 microns was coated onto prismatic sheeting (BR190500 grey prismatic sheeting sold by 3M Company). A white pigmented layer (3M 2800 UV ink sold by 3M Company) was printed on the coated sheeting using a UV inkjet printer (VUTEk QS2000 UV printer sold by Electronics for Imaging, Inc.) operated at a resolution of 356 dpi×540 dpi) to form a mesh pattern (1.714 pt×1.714 pt) of 1.25 pt line thickness.

Example 2

A white pigmented layer (3M 2800 UV ink sold by 3M Company) was printed onto prismatic sheeting (BR190500 grey prismatic sheeting sold by 3M Company) using a UV inkjet printer (VUTEk QS2000 UV printer sold by Electronics for Imaging, Inc. operated at a resolution of 356 dpi×540 dpi) to form a mesh pattern (1.714 pt×1.714 pt) of 1.25 pt line thickness. Urethane acrylate resin (GA-3 sold by Sumitomo 3M Ltd.) containing 1% by weight of an infra-red absorbing material (EX Color IR-10A sold by Nippon Shokubai Co. Ltd.) was coated onto the printed prismatic sheeting to achieve a thickness of approximately 20 microns.

Example 3

A 100:1:0.3 mixture of uretheneacrylate (KRM8292 sold by Daicel-Cytec Co. Ltd.) and photoinitiator (Daro Cur TPO sold by Chiba Japan Co. Ltd.) and an infra-red absorber (Ex Color IR-10A sold by Nippon Shokubai Co. Ltd.) were coated onto a nickel cube corner mold. The coated mold was then degassed in vacuum box. The resulting PET film was covered, squeezed, and exposed to visible light having a wavelength between about 400 nm and about 450 nm (the light was emitted by a 15 W Aqua Coral light tube sold by Philips Ltd.) for 10 minutes. The cube corner elements were then removed from the mold. The convex portions of the cube corner elements were vaporcoated with aluminum (vapor coating thickness was approximately 300 angstroms). White 300-micron-width lines at 200 micron intervals were printed on a transparent film including pressure-sensitive adhesive (3M Scotchcal 220-114 sold by 3M Company) using a Gerber Edge II printer sold by Gerber. The white lines were printed with 3M 2800 UV ink sold by 3M Company. The resulting printed film was applied to the retroreflective sheeting made as described above by adhering the pressure-sensitive adhesive portion to the retroreflective sheeting.

Comparative Example 1

Commercially available prismatic sheeting (BR190500 grey prismatic sheeting sold by 3M Company) was evaluated.

Comparative Example 2

White melamine painted plate (SPCC-SD sold by Paltec Co. Ltd.) was evaluated.

Figure 8:
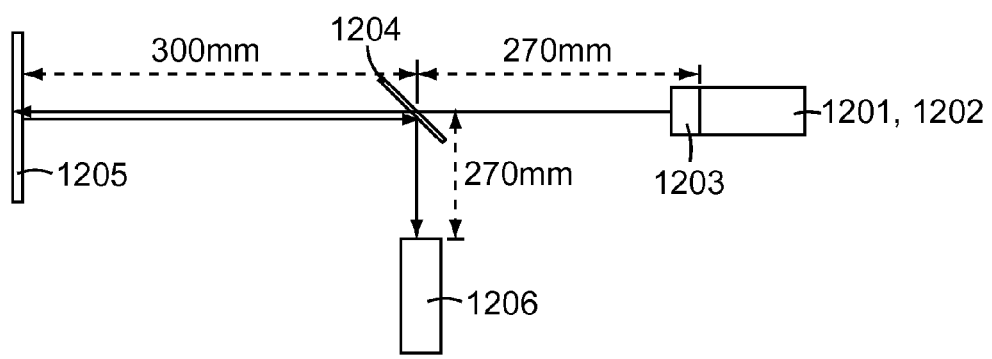
FIG. 8 shows the equipment arrangement used to measure retroreflectance of certain examples of retroreflective sheeting in accordance with the present disclosure.

Retroreflectivity of the retroreflective sheeting prepared in the above examples was measured as follows: the measurement equipment was situated as shown in FIG. 8. A halogen lamp 1201 (output at 400 nm to 800 nm with a peak wavelength of 625 nm) was used as the light source during measurement of retroreflectivity in the visible region. An LED light source 1202 emitting infra-red light having a wavelength of between about 850 nm and about 890 nm (output at 830 nm to 1000 nm with a peak wavelength of 925 nm) was used as the light source during measurement of retroreflectivity in the infra-red region. A condenser lens 1203 (ML-70 sold by Moritex Corp.) was used for condensing light. Light was input into beam splitter 1204 ((R/T (%)=50/50)), and part of the light was passed though a measurement sample 1205. Light that was retroreflected by measurement sample 1205 was returned in the direction of the beam splitter 1204, and the reflection intensity was measured by sensing the light reflected by the beam splitter 1204 using a detector 1206 (USB2000 sold by Ocean Optics, Inc.). Measurement of retroreflectivity was performed at changing incidence angles by varying the angle of the measurement sample 1205. Based on the results of measurement of the reflection intensity, the relative value of reflection intensity at an angle of incidence was calculated by normalization of the reflection intensity when the angle of incidence was zero.

Viscosity was measured by a viscosity measurement method using the single cylinder type rotary viscometer of JIS Z8803 "Viscosity of Liquid—Methods of Measurement.

Tables I and II include the results of visible region retroreflectance testing for the retroreflective sheeting made as described above at various entrance angles. Tables III and IV include the results of infra-red retroreflectance testing for the retroreflective sheeting made as described above.

TABLE I

Retroreflectance of the Retroreflective Sheeting in the Visible
Wavelength Range (450-750 nm) at Various Entrance Angles
450-750 [nm]

|  | 0 | 5 | 10 | 15 | 20 | 25 | 30 | 35 | 40 | 45 | 50 |
|---|---|---|---|---|---|---|---|---|---|---|---|
| Example 1 | 142494.1 | 139203.4 | 134151.4 | 126395.6 | 115750.6 | 103130.3 | 88401.9 | 72511.7 | 56686.9 | 41892.4 | 29653.1 |
| Example 2 | 113663.4 | 107800 | 103801.3 | 97078.8 | 89131.2 | 78893 | 67564.5 | 55020.7 | 42932.4 | 31785.7 | 22614 |
| Example 3 | 59034.3 | 42540.8 | 40809.2 | 38549.3 | 36430.7 | 33778.9 | 29592.8 | 23482.2 | 19104.7 | 15703.8 | 15526.1 |
| Comp. Ex. 1 | 1200706.7 | 1180051.4 | 1140928.2 | 1080754.4 | 994837.6 | 888374.1 | 764222.4 | 626114.9 | 484773.6 | 339531 | 226248.7 |
| Comp. Ex. 2 | 13699.4 | 9037 | 8742 | 8478.3 | 8440.2 | 8291 | 8009.8 | 7857.8 | 8039.6 | 7416.5 | 7597.4 |

TABLE II

Ratio of Retroreflectance of the Retroreflective Sheeting in the Visible Wavelength
Range (450-750 nm) to Retroreflectance of the Melamine Plate at Various Entrance Angles
450-750 [nm]

|  | 0 | 5 | 10 | 15 | 20 | 25 | 30 | 35 | 40 | 45 | 50 |
|---|---|---|---|---|---|---|---|---|---|---|---|
| Example 1/Comp. Ex. 2 | 10.4 | 15.4 | 15.3 | 14.9 | 13.7 | 12.4 | 11.0 | 9.2 | 7.1 | 5.6 | 3.9 |
| Example 2/Comp. Ex. 2 | 8.3 | 11.9 | 11.9 | 11.5 | 10.6 | 9.5 | 8.4 | 7.0 | 5.3 | 4.3 | 3.0 |
| Example 3/Comp. Ex. 2 | 4.3 | 4.7 | 4.7 | 4.5 | 4.3 | 4.1 | 3.7 | 3.0 | 2.4 | 2.1 | 2.0 |
| Comp. Ex. 1/Comp. Ex. 2 | 87.6 | 130.6 | 130.5 | 127.5 | 117.9 | 107.1 | 95.4 | 79.7 | 60.3 | 45.8 | 29.8 |

TABLE III

Retroreflectance of the Retroreflective Sheeting in the Infra-Red
Wavelength Range (850-890 nm) at Various Entrance Angles
850-890 [nm]

|  | 0 | 5 | 10 | 15 | 20 | 25 | 30 | 35 | 40 | 45 | 50 |
|---|---|---|---|---|---|---|---|---|---|---|---|
| Example 1 | 992.8 | 815 | 852.2 | 728.2 | 661 | 623.8 | 499.5 | 445.6 | 409.4 | 354 | 259 |
| Example 2 | 1251.8 | 987.6 | 942.8 | 855.6 | 787.2 | 658 | 573.6 | 487.6 | 473 | 361.6 | 356.4 |
| Example 3 | 833.7 | 1061.0 | 618.4 | 598.7 | 430.6 | 473.2 | 456.6 | 447.3 | 426.2 | 381.2 | 314.6 |
| Comp. Ex. 1 | 59004.2 | 57534.6 | 54852.6 | 50963 | 45517.2 | 39128.2 | 32028.6 | 24828 | 18092.6 | 11987.4 | 7530 |
| Comp. Ex. 2 | 597.8 | 597.8 | 413.2 | 363.4 | 317.6 | 328.6 | 322 | 335.2 | 323.2 | 278.6 | 254.8 |

TABLE IV

Ratio of Retroreflectance of the Retroreflective Sheeting in the Infra-Red Wavelength
Range (850-890 nm) to Retroreflectance of the Melamine Plate at Various Entrance Angles
850-890 [nm]

|  | 0 | 5 | 10 | 15 | 20 | 25 | 30 | 35 | 40 | 45 | 50 |
|---|---|---|---|---|---|---|---|---|---|---|---|
| Example 1/Comp. Ex. 2 | 1.7 | 1.4 | 2.1 | 2.0 | 2.1 | 1.9 | 1.6 | 1.3 | 1.3 | 1.3 | 1.0 |
| Example 2/Comp. Ex. 2 | 2.1 | 1.7 | 2.3 | 2.4 | 2.5 | 2.0 | 1.8 | 1.5 | 1.5 | 1.3 | 1.4 |
| Example 3/Comp. Ex. 2 | 1.4 | 1.8 | 1.5 | 1.6 | 1.4 | 1.4 | 1.4 | 1.3 | 1.3 | 1.4 | 1.2 |
| Comp. Ex. 1/Comp. Ex. 2 | 98.7 | 96.2 | 132.8 | 140.2 | 143.3 | 119.1 | 99.5 | 74.1 | 56.0 | 43.0 | 29.6 |

The results of Table II show that, at entrance angles of 30 degrees or less, the ratio of retroreflection of the retroreflective sheeting of Examples 1, 2, and 3 to the melamine plate were 3.7-15.4. The results of Table IV show that, at entrance angles of 30 degrees or less, the ratio of retroreflection of the retroreflective sheeting of Examples 1 and 2 to the melamine plate were 3 or less while that of the comparative example was approximately 100.

Whiteness (or CAP-Y) was measured using a SUGA Test Instruments Co., Ltd. SM-7 color meter (Standard source C, 2 degrees viewing angle). The results of these measurements are included in Table V.

TABLE V

Cap-Y Measurements for Retroreflective Sheeting of Examples 1-3
and Comparative Example 1

|  | Cap-Y |
|---|---|
| Example 1 | 44.74 |
| Example 2 | 36.61 |
| Example 3 | 43.35 |
| Comp. Ex. 1 | 12.91 |

The sheeting of comparative example 1 had a CAP-Y of 12.91 while the CAP-Y of retroreflective sheeting of Examples 1, 2, and 3 were, respectively, 44.74, 36.61, and 43.35. The value ISO specification for retroreflective license plates requires a CAP-Y of 35.0, so the retroreflective sheeting of the comparative example would not have adequate whiteness, while the retroreflective sheeting of examples 1-3 would have adequate whiteness.

Although various embodiments and implementations have been described in the present application, except when stated explicitly otherwise, any embodiment of the present application can be produced using any known materials and production methods.

The recitation of all numerical ranges by endpoint is meant to include all numbers subsumed within the range (i.e., the range 1 to 10 includes, for example, 1, 1.5, 3.33, and 10).

Those having skill in the art will appreciate that many changes may be made to the details of the above-described embodiments and implementations without departing from the underlying principles thereof. Further, various modifications and alterations of the present application will become apparent to those skilled in the art without departing from the spirit and scope of the invention. The scope of the present application should, therefore, be determined only by the following claims.

What is claimed is:

1. A retroreflective sheet defining a first side and a second side opposite to the first side, the retroreflective sheet comprising:
    cube corner elements including a substantially planar viewing surface and a structured surface, wherein the substantially planar viewing surface is nearer the first side than the structured surface is;
    a reflector layer adjacent to the structured surface of the cube corner elements, wherein the reflector layer is configured to reflect at least visible light incident transmitted through the cube corner elements to the reflector layer; and
    an infra-red non-transmissive material in the retroreflective sheet between the reflector layer and the first side of the retroreflective sheet, wherein the infra-red non-transmissive material leaves retroreflectivity of visible light incident on the substantially planar viewing surface of the cube corner elements and transmitted through the cube corner elements to the reflector layer substantially unaffected.

2. The retroreflective sheet of claim 1, wherein the cube corner elements are one of full cubes, truncated cubes, cube corner type trigonal pyramids, cube corner type cavities, and the like.

3. The retroreflective sheet of claim 1, further including a whiteness-enhancing material.

4. The retroreflective sheet of claim 1, wherein the reflector layer includes one of a mirror-surfaced reflection layer and a multi-layer optical film.

5. The retroreflective sheet of claim 1, further including at least one of a protective layer and a sealing film.

6. The retroreflective sheet of claim 1, wherein the infra-red non-transmissive material forms a separate layer from the cube corner elements and the reflector layer.

7. The retroreflective sheet of claim 1, wherein the infra-red non-transmissive material is in the cube corner elements.

8. The retroreflective sheet of claim 3, wherein the whiteness-enhancing material is in the cube corner elements.

9. The retroreflective sheet of claim 3, wherein the whiteness-enhancing material and the infra-red non-transmissive material form a separate layer from the cube corner elements and the reflector layer.

10. A retroreflective sheet defining a first side and a second side opposite to the first side, the retroreflective sheet comprising:
    cube corner elements including a substantially planar viewing surface and a structured surface, wherein the substantially planar viewing surface is nearer the first side than the structured surface is;
    a reflector layer adjacent to the structured surface of the cube corner elements, wherein the reflector layer is configured to reflect at least visible light incident transmitted through the cube corner elements to the reflector layer; and
    an infra-red non-transmissive layer adjacent to the substantially planar viewing surface of the cube corner elements, wherein the infra-red non-transmissive material leaves retroreflectivity of visible light incident on the substantially planar viewing surface of the cube corner elements and transmitted through the cube corner elements to the reflector layer substantially unaffected.

11. The retroreflective sheet of claim 10, further including at least one of a protective layer and a sealing layer.

12. The retroreflective sheet of claim 10, wherein the cube corner elements are one of full cubes, truncated cubes, cube corner type trigonal pyramids, cube corner type cavities, and the like.

13. The retroreflective sheet of claim 10, further including a whiteness-enhancing material deposited on the infra-red non-transmissive layer.

14. The retroreflective sheet of claim 10, wherein the reflector layer includes one of a mirror-surfaced reflection layer and a multi-layer optical film.

15. A retroreflective sheet defining a first side and a second side opposite to the first side, the retroreflective sheet comprising:
    cube corner elements including a substantially planar viewing surface and a structured surface, wherein the substantially planar viewing surface is nearer the first side than the structured surface is; and
    a reflector layer adjacent to the structured surface of the cube corner elements, wherein the reflector layer is configured to reflect at least visible light incident transmitted through the cube corner elements to the reflector layer;
    wherein the cube corner elements include an infra-red non-transmissive material, and wherein the infra-red non-transmissive material leaves retroreflectivity of visible light incident on the substantially planar viewing surface of the cube corner elements and transmitted through the cube corner elements to the reflector layer substantially unaffected.

16. The retroreflective sheet of claim 15, further including a whiteness-enhancing material.

17. The retroreflective sheeting of claim 16, wherein the whiteness-enhancing material is deposited into a front side of the cube corner elements.

18. The retroreflective sheet of claim 15, wherein the cube corner elements include a whiteness-enhancing material.

19. The retroreflective sheet of claim 15, further including at least one of a protective layer and a sealing layer.

20. The retroreflective sheet of claim 15, wherein the cube corner elements are one of full cubes, truncated cubes, cube corner type trigonal pyramids, cube corner type cavities, and the like.

21. The retroreflective sheet of claim 15, wherein the reflector layer includes one of a mirror-surfaced reflection layer and a multi-layer optical film.

22. A license plate utilizing the retroreflective sheet according to claim 1.

23. An Automated License Plate Reader (ALPR) system, comprising:
a license plate according to claim 22;
a light source that directs light at the license plate; and
a machine capable of imaging the license plate.

24. A license plate utilizing the retroreflective sheet according to claim 10.

25. A license plate utilizing the retroreflective sheet according to claim 15.

26. An Automated License Plate Reader (ALPR) system, comprising:
a license plate according to claim 24;
a light source that directs light at the license plate; and
a machine capable of imaging the license plate.

27. An Automated License Plate Reader (ALPR) system, comprising:
a license plate according to claim 25;
a light source that directs light at the license plate; and
a machine capable of imaging the license plate.

28. The retroreflective sheet of claim 1 wherein the infra-red non-transmissive material is visible light transmissive.

29. The retroreflective sheet of claim 10 wherein the infra-red non-transmissive material is visible light transmissive.

30. The retroreflective sheet of claim 15 wherein the infra-red non-transmissive material is visible light transmissive.

31. A retroreflective sheet defining a first side and a second side opposite to the first side, the retroreflective sheet comprising:
cube corner elements including a substantially planar viewing surface and a structured surface, wherein the substantially planar viewing surface is nearer the first side than the structured surface is;
a whiteness-enhancing material; and
an infra-red non-transmissive material in the retroreflective sheet between the structured surface of the cube corner elements and the first side of the retroreflective sheet, wherein the infra-red non-transmissive material leaves retroreflectivity of visible light incident on the substantially planar viewing surface of the cube corner elements and transmitted through the cube corner elements to the structured surface substantially unaffected.

32. The retroreflective sheet of claim 31 wherein the infra-red non-transmissive material is visible light transmissive.

33. A retroreflective sheet defining a first side and a second side opposite to the first side, the retroreflective sheet comprising:
cube corner elements including a substantially planar viewing surface and a structured surface, wherein the substantially planar viewing surface is nearer the first side than the structured surface is; and
an infra-red non-transmissive material in the cube corner elements, wherein the infra-red non-transmissive material leaves retroreflectivity of visible light incident on the substantially planar viewing surface of the cube corner elements and transmitted through the cube corner elements to the structured surface substantially unaffected.

34. The retroreflective sheet of claim 33 wherein the infra-red non-transmissive material is visible light transmissive.

35. A license plate utilizing the retroreflective sheet according to claim 31.

36. A license plate utilizing the retroreflective sheet according to claim 33.

37. An ALPR system, comprising:
a license plate according to claim 35;
a light source that directs light at the license plate; and
a machine capable of imaging the license plate.

38. An ALPR system, comprising:
a license plate according to claim 36;
a light source that directs light at the license plate; and
a machine capable of imaging the license plate.

* * * * *